United States Patent
Piscitello et al.

(10) Patent No.: US 10,002,201 B2
(45) Date of Patent: *Jun. 19, 2018

(54) NAMED URL ENTRY

(71) Applicant: Google LLC, Mountain View, CA (US)

(72) Inventors: John Piscitello, San Francisco, CA (US); Xuefu Wang, Los Altos, CA (US); Simon Tong, Mountain View, CA (US); Breen Hagan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 14/862,399

(22) Filed: Sep. 23, 2015

(65) Prior Publication Data

US 2016/0012112 A1    Jan. 14, 2016

Related U.S. Application Data

(63) Continuation of application No. 12/163,202, filed on Jun. 27, 2008, now Pat. No. 9,256,694, which is a
(Continued)

(51) Int. Cl.
*G06F 7/00* (2006.01)
*G06F 17/30* (2006.01)

(52) U.S. Cl.
CPC .. *G06F 17/30887* (2013.01); *G06F 17/30011* (2013.01); *G06F 17/3066* (2013.01);
(Continued)

(58) Field of Classification Search
CPC ........ G06F 17/30864; G06F 17/30657; G06F 17/30887; G06F 17/30873; G06F 17/30876; G06F 17/30991; G06F 17/30861
See application file for complete search history.

(56) References Cited

U.S. PATENT DOCUMENTS 5,659,732 A    8/1997  Kirsch
5,764,906 A *  6/1998  Edelstein .......... G06F 17/30887
                                                707/E17.115
(Continued)

FOREIGN PATENT DOCUMENTS

CN    1389811    1/2003
EP    1283482    2/2003
(Continued)

OTHER PUBLICATIONS

Armstrong et al. "WebWatcher: A Learning Apprentice for the World Wide Web" School of Computer Science Carnegie Mellon University 1995 7 pages.
(Continued)

*Primary Examiner* — Daniel Kuddus
(74) *Attorney, Agent, or Firm* — Fish & Richardson P.C.

(57) ABSTRACT

Methods and systems allow users to enter natural language terms that describe a particular web site into an address field of a browser instead of a formal URL. The terms are evaluated to determine whether they correspond, with a high likelihood, to a particular web site. If so, this web site may be immediately accessed. If not, a list of search results based on the terms may be displayed by the browser.

14 Claims, 9 Drawing Sheets

Related U.S. Application Data continuation of application No. 10/953,497, filed on Sep. 30, 2004, now Pat. No. 7,401,072, which is a continuation-in-part of application No. 10/457,488, filed on Jun. 10, 2003, now Pat. No. 7,836,391.

(60) Provisional application No. 60/587,548, filed on Jul. 14, 2004.

(52) U.S. Cl.
CPC .. *G06F 17/30528* (2013.01); *G06F 17/30554* (2013.01); *G06F 17/30657* (2013.01); *G06F 17/30864* (2013.01); *G06F 17/30867* (2013.01); *Y10S 707/99933* (2013.01); *Y10S 707/99934* (2013.01); *Y10S 707/99935* (2013.01); *Y10S 707/99936* (2013.01)

(56) References Cited

U.S. PATENT DOCUMENTS

| | | |
|---|---|---|
| 5,774,888 A | 6/1998 | Light |
| 5,864,846 A | 1/1999 | Voorhees et al. |
| 5,873,107 A | 2/1999 | Borovoy et al. |
| 5,920,859 A | 7/1999 | Li |
| 5,944,793 A | 8/1999 | Islam et al. |
| 5,947,930 A | 9/1999 | Schwemberger et al. |
| 5,970,505 A | 10/1999 | Ebrahimn |
| 5,983,218 A | 11/1999 | Syeda-Mahmood |
| 5,983,220 A | 11/1999 | Schmitt |
| 5,987,457 A | 11/1999 | Ballard |
| 6,006,217 A | 12/1999 | Lumsden |
| 6,006,225 A | 12/1999 | Bowman et al. |
| 6,012,053 A | 1/2000 | Pant et al. |
| 6,067,552 A | 5/2000 | Yu |
| 6,070,158 A | 5/2000 | Kirsch et al. |
| 6,094,649 A | 7/2000 | Bowen et al. |
| 6,101,503 A | 8/2000 | Cooper et al. |
| 6,112,202 A | 8/2000 | Kleinberg |
| 6,151,624 A * | 11/2000 | Teare ............... G06F 17/30887 707/999.005 |
| 6,167,370 A | 12/2000 | Tsourikov et al. |
| 6,189,002 B1 | 2/2001 | Roitblat |
| 6,285,999 B1 | 9/2001 | Page |
| 6,356,908 B1 | 3/2002 | Brown et al. |
| 6,499,029 B1 | 12/2002 | Kurapati et al. |
| 6,526,440 B1 * | 2/2003 | Bharat ............... G06F 17/30864 707/999.003 |
| 6,564,201 B1 | 5/2003 | Hamsa |
| 6,564,208 B1 | 5/2003 | Littlefield et al. |
| 6,571,239 B1 | 5/2003 | Cole et al. |
| 6,591,261 B1 | 7/2003 | Arthurs |
| 6,601,061 B1 | 7/2003 | Holt et al. |
| 6,606,615 B1 | 8/2003 | Jennings et al. |
| 6,640,218 B1 | 10/2003 | Golding et al. |
| 6,697,799 B1 | 2/2004 | Neal et al. |
| 6,785,671 B1 | 8/2004 | Bailey et al. |
| 6,839,702 B1 | 1/2005 | Patel et al. |
| 6,915,308 B1 | 7/2005 | Evans et al. |
| 6,963,867 B2 | 11/2005 | Ford et al. |
| 6,990,628 B1 * | 1/2006 | Palmer ............... G06F 17/2211 707/999.003 |
| 7,062,561 B1 * | 6/2006 | Reisman ............... G06F 17/30 707/E17.109 |
| 7,073,121 B2 | 7/2006 | Brown et al. |
| 7,130,808 B1 | 10/2006 | Ranka et al. |
| 7,130,819 B2 | 10/2006 | Wang et al. |
| 7,194,483 B1 | 3/2007 | Mohan et al. |
| 7,289,985 B2 | 10/2007 | Zeng et al. |
| 7,296,016 B1 * | 11/2007 | Farach-Colton .. G06F 17/30867 |
| 7,346,615 B2 | 3/2008 | Bem |
| 7,401,072 B2 | 6/2008 | Piscitello et al. |
| 7,457,802 B2 | 11/2008 | Coleman et al. |
| 7,499,948 B2 | 3/2009 | Smith et al. |
| 7,502,994 B2 | 3/2009 | Kocol |
| 7,599,950 B2 | 10/2009 | Walther et al. |
| 7,769,751 B1 * | 8/2010 | Wu ............... G06F 17/30699 707/728 |
| 7,925,644 B2 * | 4/2011 | Lin ............... G06Q 10/10 707/713 |
| 8,447,760 B1 * | 5/2013 | Tong ............... G06F 17/3053 707/714 |
| 2001/0044758 A1 | 11/2001 | Talib et al. |
| 2002/0042738 A1 | 4/2002 | Srinivasan et al. |
| 2002/0059192 A1 * | 5/2002 | Ling ............... G06F 17/30864 |
| 2002/0065802 A1 | 5/2002 | Uchiyama |
| 2002/0120505 A1 | 8/2002 | Henkin et al. |
| 2002/0165856 A1 | 11/2002 | Gilfillan et al. |
| 2002/0165860 A1 | 11/2002 | Glover et al. |
| 2002/0165873 A1 | 11/2002 | Kwock et al. |
| 2003/0018659 A1 * | 1/2003 | Fuks ............... G06F 17/30646 715/230 |
| 2003/0046389 A1 | 3/2003 | Thieme |
| 2003/0050927 A1 | 3/2003 | Hussam |
| 2003/0055816 A1 | 3/2003 | Paine et al. |
| 2003/0079179 A1 | 4/2003 | Brown |
| 2003/0120641 A1 | 6/2003 | Pelletier |
| 2003/0126461 A1 | 7/2003 | Barker et al. |
| 2003/0195877 A1 | 10/2003 | Ford et al. |
| 2003/0204536 A1 | 10/2003 | Keskar et al. |
| 2003/0212673 A1 * | 11/2003 | Kadayam ......... G06F 17/30864 |
| 2003/0225100 A1 * | 12/2003 | Assens ............... C07D 223/14 514/252.13 |
| 2003/0225750 A1 * | 12/2003 | Farahat ............ G06F 17/30707 |
| 2003/0226100 A1 * | 12/2003 | Farahat ............ G06F 17/30707 715/263 |
| 2003/0236701 A1 | 12/2003 | Rowney et al. |
| 2004/0024752 A1 | 2/2004 | Manber et al. |
| 2004/0044571 A1 | 3/2004 | Bronnimann et al. |
| 2004/0078224 A1 | 4/2004 | Schramm-Apple et al. |
| 2004/0088241 A1 | 5/2004 | Rebane et al. |
| 2004/0205454 A1 | 10/2004 | Gansky et al. |
| 2005/0086185 A1 | 4/2005 | Achliptas et al. |
| 2005/0097089 A1 | 5/2005 | Nielsen et al. |
| 2005/0137939 A1 | 6/2005 | Calabria et al. |
| 2005/0149851 A1 * | 7/2005 | Mittal ............... G06F 17/2235 715/205 |
| 2006/0095281 A1 | 5/2006 | Chickering et al. |
| 2006/0122976 A1 | 6/2006 | Baluja et al. |
| 2006/0167842 A1 | 7/2006 | Watson |
| 2006/0265508 A1 | 11/2006 | Angel et al. |
| 2007/0038508 A1 | 2/2007 | Jain et al. |
| 2008/0306819 A1 | 12/2008 | Berkhin et al. |
| 2009/0144288 A1 | 6/2009 | Refuah et al. |
| 2012/0191705 A1 * | 7/2012 | Tong ............... G06F 17/30864 707/727 |

FOREIGN PATENT DOCUMENTS

| | | |
|---|---|---|
| KR | 20030089025 | 11/2003 |
| KR | 20040048103 | 6/2004 |
| WO | 9939280 | 8/1999 |
| WO | 04051515 | 6/2004 |

OTHER PUBLICATIONS

Bayers Chip "I'm Feeling Lucky" Wired Oct. 2001 4 pages downloaded from the internet on Apr. 8, 2013 http://www.wired.com/wired/archive/9.10/google_pr.html.

Brin et al. "The Anatomy of a Large-Scale Hypertextual Web Search Engine" Computer Science Department Stanford University 1998 20 pages.

Co-pending U.S. Appl. No. 10/457,488, filed Jun. 10, 2003 entitled "Document Search Engine Including Highlighting of Confident Results" [Simon Tong] 19 pages.

Co-pending U.S. Appl. No. 12/901,274, filed Oct. 8, 2010 entitled "Document Search Engine Including Highlighting of Confident Results" by Simon Tong 19 pages.

Dziadosz et al. "Do Thumbnail Previews Help Users Make Better Relevance Decisions about Web Search Results?" Aug. 11-15, 2002 pp. 365-366 XP002672248.

(56) References Cited

OTHER PUBLICATIONS

Dziadosz et al. "Do Thumbnail Previous Help Users Make Better Relevance Decisions About Web Search Results", SIGIR, Aug. 2002.
European Search Report corresponding to EP12152416 dated Apr. 5, 2012 11 pages.
Google Special Search Features Web Page Translation Jun. 4, 20014 pages downloaded from the internet on Apr. 8, 2013 http://web.archive.org/web/20010604080429/http:/www.google.com/help/features.html.
Liu et al. "Automatic Query Type Identification Based on Click Through Information" 2006 8 pages.
Wang et al. "Query Find: Search Ranking Based on Users' Feedback and Expert's Agreement" Proceedings of the 2004 IEEE International Conference on e-Technology e-Commerce and e-Service (EEE'04) Apr. 19, 2004 pp. 299-304 XP01 0697608.
Xue et al. "Optimizing Web Search Using Click Through Data" 2004 ACM pp. 118-126.
Xue et al., "Log mining to improve the performance of site search," Web Information Systems Engineering (Workshops), 2002, Proceedings of the Third International Conference on Dec. 11, 2002, IEEE, pp. 238-245, Jan. 2002.
Office Action issued in European Application No. 05771520.3 dated Jun. 21, 2016, 7 pages.

* cited by examiner

NAMED URL ENTRY

RELATED APPLICATIONS

This application is a continuation of U.S. application Ser. No. 12/163,202, filed Jun. 27, 2008, which is a continuation of U.S. application Ser. No. 10/953,497, filed Sep. 30, 2004, which claims the benefit of U.S. Provisional Application No. 60/587,548, filed Jul. 14, 2004. U.S. application Ser. No. 10/953,497 is a continuation-in-part of U.S. patent application Ser. No. 10/457,488, filed Jun. 10, 2003, each of which are incorporated by reference.

BACKGROUND

A. Field of the Invention

Implementations consistent with the principles of the present invention relate generally to document browsing and searching and, more particularly, to using a search engine to assist in document browsing.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

When navigating the web, users often type in uniform resource locators (URLs) that refer to a particular web document that they wish to access. URLs often must be entered as an exact pre-defined string that correspond to the web document. This can be inconvenient and unwieldy for the user.

SUMMARY

One aspect is a method that includes receiving one or more terms by a browser and initiating a search based on the terms to obtain search results. The method further includes displaying, when the search results includes a very relevant result, a document corresponding to the very relevant result. The method also includes displaying, when the search results do not include a very relevant result, links to a number of documents corresponding to the search results.

Another aspect is directed to a computer-readable medium containing programming instructions to be executed by one or more processors. The computer-readable medium includes instructions for implementing a search toolbar in a browser that includes an address toolbar, the search toolbar modifying functionality of the address toolbar by enabling the address toolbar to accept double byte characters. The computer-readable medium also includes instructions for transmitting terms entered into the address toolbar to a search engine and instructions for receiving search results from the search engine. Further, the computer-readable medium includes instructions for displaying in the browser, when the search result includes a very relevant result, a document corresponding to the very relevant result; and instructions for displaying in the browser, when the search result does not include a very relevant results, links to documents corresponding to the search results.

Another aspect is a method that includes receiving a search query from a user and performing a search of a document database based on the search query to obtain at least one relevant document link. The method further includes determining whether the at least one relevant document link is likely to correspond to a particular document that the user is attempting to access. The method further includes returning a link to the particular document to the user for immediate display of the particular document to the user when it is determined that one of the at least one relevant document links is likely to correspond to the particular document that the user is attempting to access. Still further, the method includes returning a plurality of relevant documents links for display to the user when it is not determined that one of the at least one relevant document links is likely to correspond to the particular document that the user is attempting to access.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

Overview

Traditionally, when navigating to a web site, users may either select from a previously set list of "bookmarks" or type a URL or other predetermined phrase into the address bar of their browser. Consistent with aspects of the invention described below, users may also enter a natural language search query. For example, to visit the home pages of the companies IBM or Lands End, the user may simply enter "ibm" or "lands end," instead of "www.ibm.com" or "www.landsend.com." If a determination is able to be made, with acceptable certainty, that the user intended to visit a particular site, the user will be taken directly to that site.

System Overview

Figure 1:
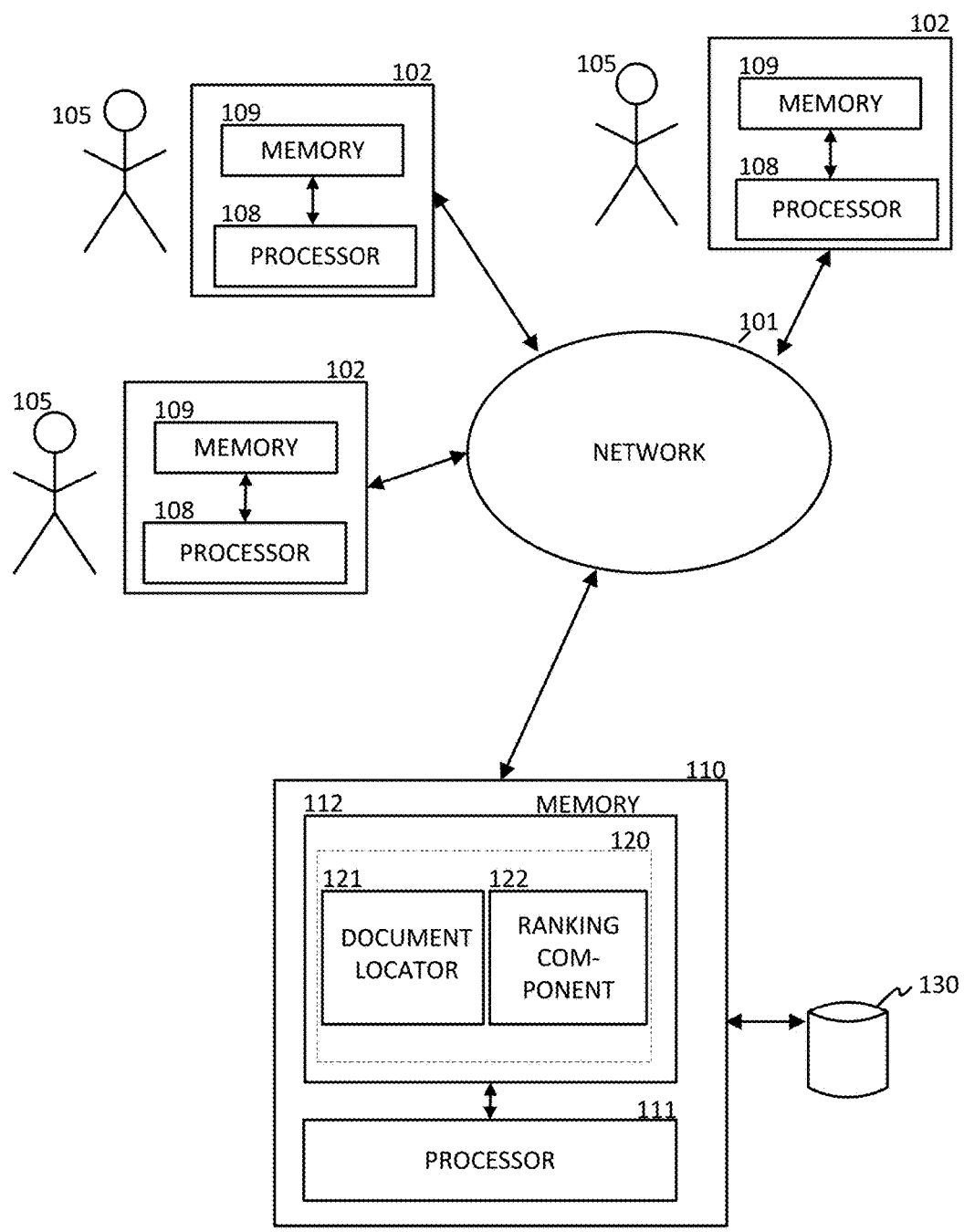
FIG. 1 is a diagram illustrating an exemplary system in which concepts consistent with the present invention may be implemented.

FIG. 1 is a diagram illustrating an exemplary system in which concepts consistent with the present invention may be implemented. The system includes multiple client devices 102, a server device 110, and a network 101, which may include, for example, the Internet. Client devices 102 each include a computer-readable memory 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110.

Similar to client devices 102, server device 110 may include a processor 111 coupled to a computer-readable memory 112. Server device 110 may additionally include a secondary storage element, such as database 130.

Client processors 108 and server processor 111 can be any of a number of well known computer processors. In general, client device 102 may be any type of computing platform connected to a network and that interacts with application programs, such as a digital assistant or a "smart" cellular telephone or pager. Server 110, although depicted as a single computer system, may be implemented as a network of computer processors.

Memory 112 contains a search engine program 120. Search engine program 120 locates relevant information in response to search queries from users 105. In particular, users 105 send search queries to server device 110, which responds by returning a list of relevant information to user 105. Typically, users 105 ask server device 110 to locate web pages relating to a particular topic and stored at other devices or systems connected to network 101. Search engine 120 includes document locator 121 and a ranking component 122. In general, document locator 121 finds a set of documents whose contents match a user search query. Ranking component 122 may rank the located set of documents based on relevance and may generate a relevance score for each document that indicates a level of relevance. Search engine 120 may then return a list of links pointing to the set of documents determined by document locator 121. The list of links may be sorted based on the relevance scores determined by ranking component 122.

Document locator 121 may initially locate documents from a document corpus stored in database 130 by comparing the terms in the user's search query to the documents in the corpus. In general, processes for indexing web documents and searching the indexed corpus of web documents to return a set of documents containing the searched terms are well known in the art. Accordingly, this functionality of document locator 121 will not be described further herein.

Ranking component 122 assists search engine 120 in returning relevant documents to the user by ranking the set of documents identified by document locator 121. This ranking may take the form of assigning a numerical value, called a relevance score, corresponding to the calculated relevance of each document identified by document locator 121. Alternatively, the functions of ranking component 122 and document locator 121 may be combined so that document locator 121 produces a set of relevant documents each having rank values.

As used herein, a document is to be broadly interpreted to include any machine-readable and machine-storable work product. A document may be an email, a file, a combination of files, one or more files with embedded links to other files, etc. In the context of the Internet, a common document is a Web page. Web pages often include content and may include embedded information (such as meta information, hyperlinks, etc.) and/or embedded instructions (such as Javascript, etc.).

Operation of Search Engine 120

Consistent with an aspect of the invention, links to sets of web documents returned by search engine 120 may include, in addition to text snippets that describe the web documents, a visual cue that informs the user that the web document is likely to be relevant to the user's search query. The visual cue may include graphic information through which the user can quickly and easily verify whether the link is the link that the user intended to locate. In one aspect of the invention, the link corresponding to a document that is determined to be "highly relevant" (i.e., a high confidence that the document is the document that the user would be most interested in viewing) to the user search query is displayed with the visual cue.

Figure 2:
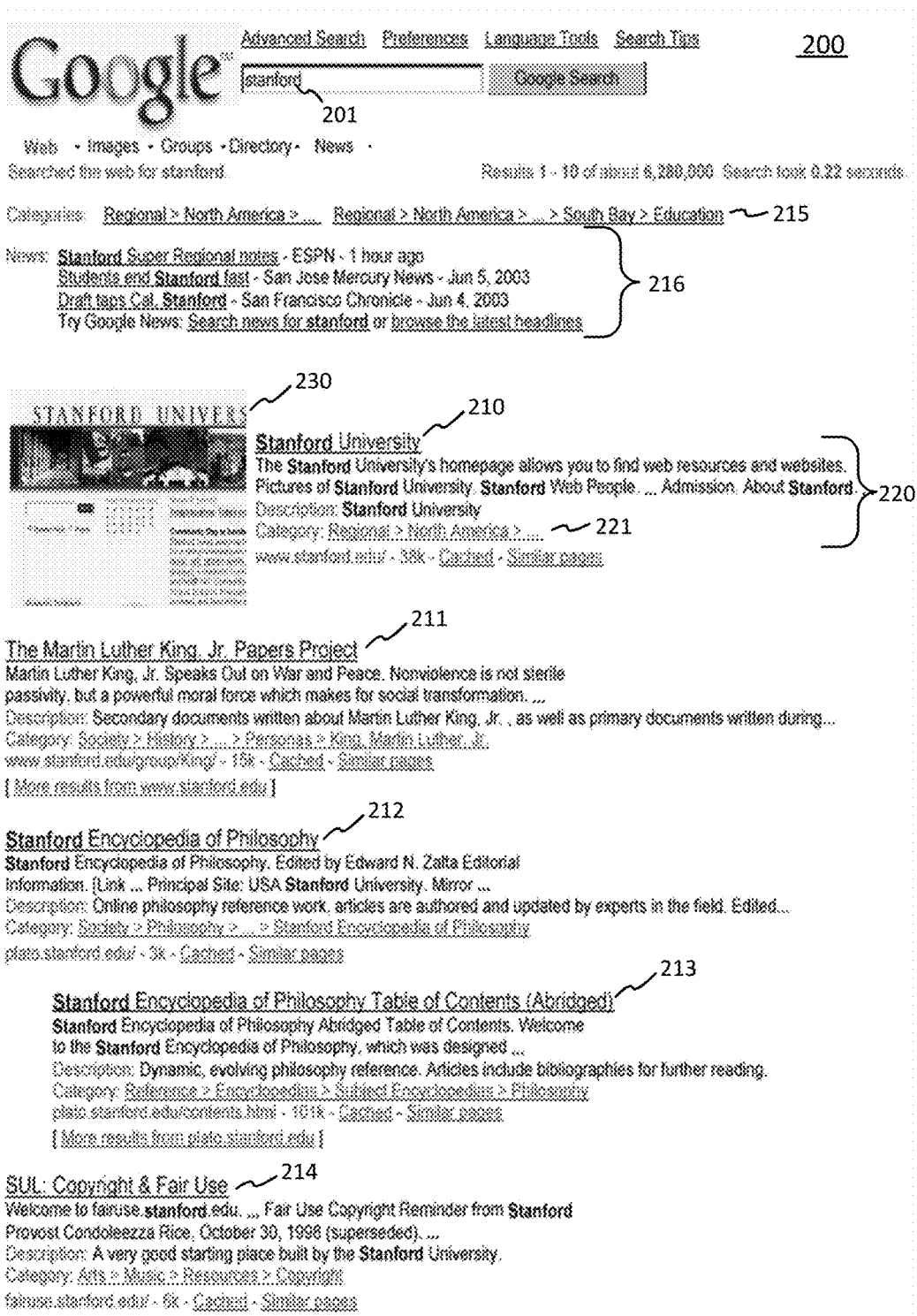
FIG. 2 is a diagram illustrating a document that includes links to web documents displayed in response to a search query.

FIG. 2 is a diagram illustrating a document 200 that includes links to web documents that may be displayed to a user at a client device 102 in response to a search query. The document may be generated by search program 120 in response to the user search query and displayed by a web browser at one of client devices 102.

In the exemplary document shown in FIG. 2, a search query 201 entered by the user was "stanford." Document 200 includes a number of links 210, 211, 212, 213, and 214 to web documents, such as web pages, that search engine 120 determined to be potentially relevant to search query 201. In addition to the returned links 210-214, document 200 may include other information, such as the general category 215 and current events/news links 216 that correspond to search query 201.

The user may select any of links 210-214 to thereby direct the web browser to return the web document pointed-to by the links. Each of links 210-214 may also include, for example, a snippet of text 220 that describes the linked web document and a description of a category 221 in which the web document is classified.

Consistent with an aspect of the invention, one or more of the links 210-214 may contain a visual cue 230 corresponding to the link. In the example shown in FIG. 2, visual cue 230 is a miniaturized ("thumbnail") rendering of the web page corresponding to link 210. In this example, search query 201 was "stanford." Search engine 120 determined that the most highly ranked link for "stanford" is the link to the web site of Stanford University (stanford.edu). Accordingly, search engine 120 included visual cue 230 in document 200.

In some implementations, search engine 120 may only display visual cues 230 when a link is determined to be "very relevant" to the search query, where "very relevant" is defined by an objective standard for determining relevancy. For example, assume that the large majority of "stanford" search queries eventually result in the user selecting the stanford.edu link. In this situation, search engine 120 may realize that stanford.edu is a very relevant link and therefore include visual cue 230 in document 200.

By including visual cue 230 with very relevant links, users may learn to associate the visual cue with links that search engine 120 is confident matches the user's intentions. As the users begin to trust visual cue 230, the visual cue allows the user to home in on the relevant search results faster as they will not necessarily need to read the corresponding snippet 220. This may thus result in a decreased "time to satisfaction" for the user and a concomitant increase in search engine satisfaction.

Figure 3:
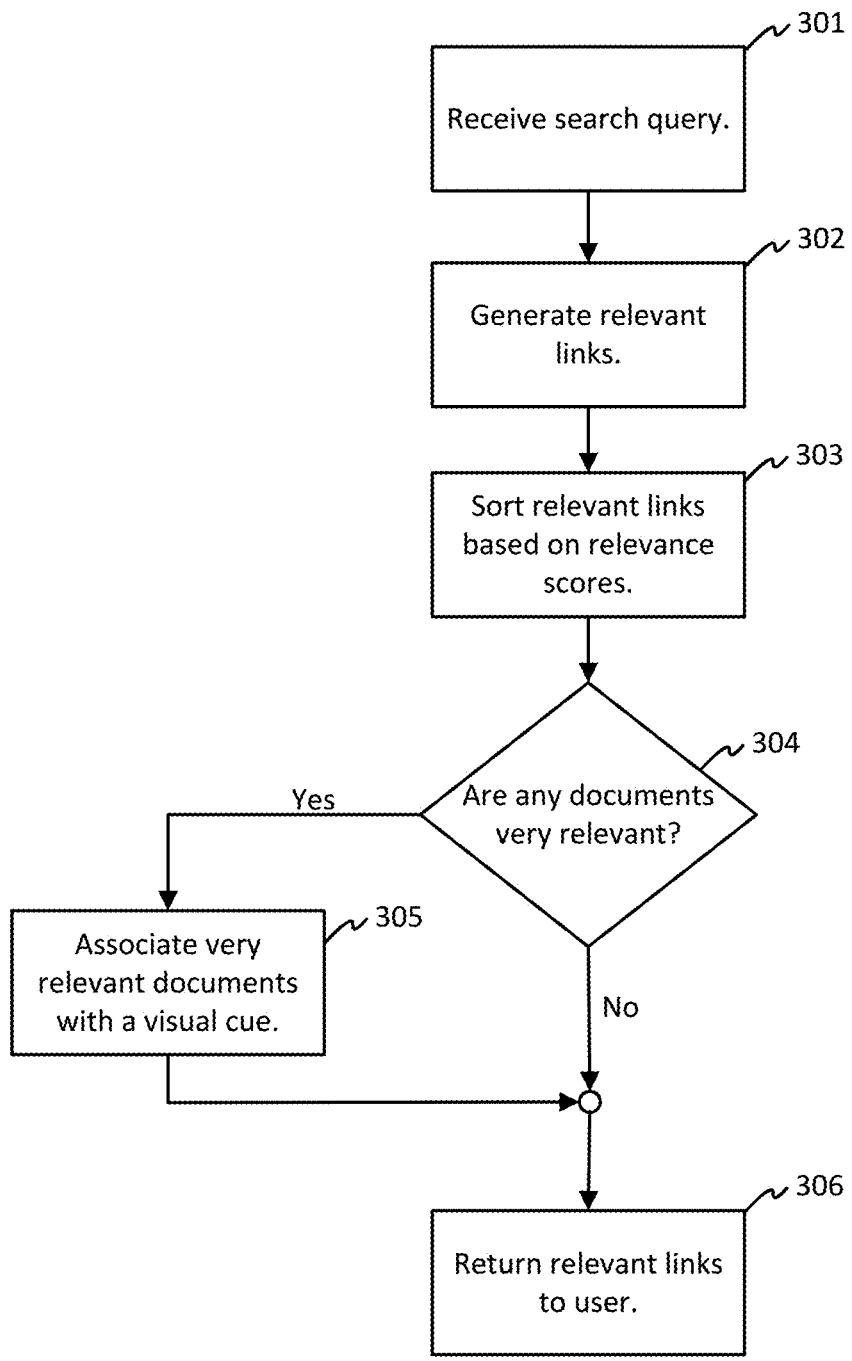
FIG. 3 is a flow chart illustrating operation of a search engine consistent with an aspect of the invention.

FIG. 3 is a flow chart illustrating operation of search engine program 120 consistent with an aspect of the invention. Search engine program 120 may begin by receiving a search query from one of users 105 (act 301). Based on the search query, document locator 121 may generate a set of links to documents that are relevant to the search query (act 302). The set of links may be sorted based on a relevance metric returned for each of the documents from ranking component 122 (act 303).

Search engine program 120 may determine whether any of the links returned by document locator 121 are associated with "very relevant" documents (act 304). Documents that are determined to be very relevant may be associated with a visual cue, such as visual cue 230 (act 305). Server device 110 may then return the set of links to the user that entered the search query (act 306). The returned set of links may be transmitted as a web document formatted in a manner similar to document 200, and may particularly include visual cues 230 associated with the very relevant documents.

Figure 4:
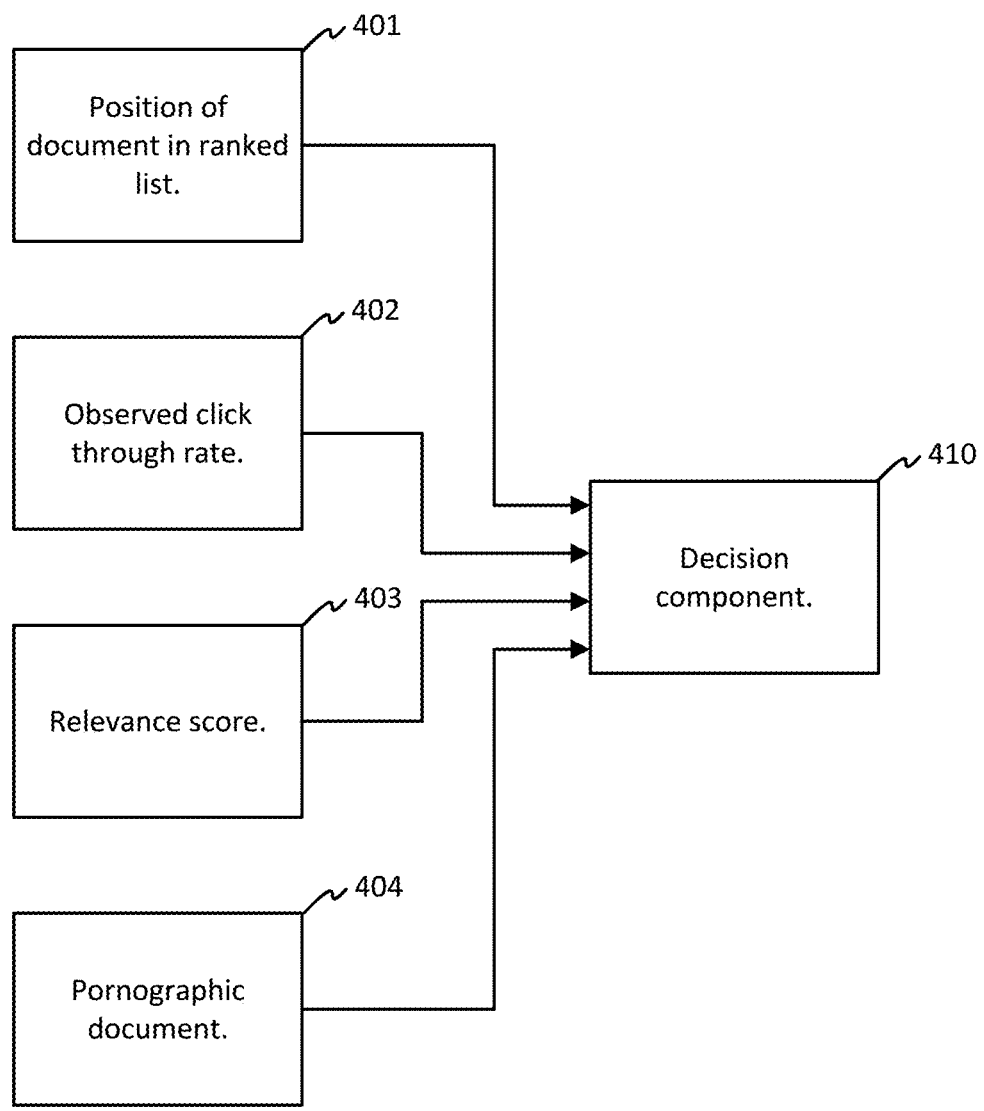
FIG. 4 is a block diagram conceptually illustrating the determination of whether a document is very relevant to a user search query.

FIG. 4 is a block diagram conceptually illustrating the determination of whether a document is very relevant by search engine program 120.

Whether a particular document, D, is very relevant may depend on a number of parameters. In one implementation, these parameters may be calculated by search engine program 120 and are shown in FIG. 4 as components 401-404. These components include the position of the document D in the ranked list of documents (component 401), the observed historical user click through rate compared to the other documents in the ranked list of documents (component 402), the relevance score for the document relative to the relevance scores for the other documents in the ranked list of documents (component 403), and whether the document is detected as being a pornographic document (component 404).

Component 401 may be determined directly based on the sorted set of links returned from ranking component 122. In general, a document at the top of the sorted list is more likely to be a very relevant document than a document further down on the list.

Component 402 may be based on a historical click through rate of other users in response to the links in the returned set of links. For example, search engine program 120 may calculate a ratio between document D and each other document in the returned set of links. The ratio may be calculated, for each other document E, as:

$$\hat{D}/\hat{E}, \quad (1)$$

where $\hat{D}$ represents the total number of times users have selected document D and $\hat{E}$ represents the total number of times users have selected document E. Thus, for each document E, the ratio gives the popularity of document D relative to document E. In an alternate implementation of formula (1) for measuring historical click through rates, $\hat{D}$ may be defined to represent the total number of times users have selected document D for a particular query Q and $\hat{E}$ may be defined as the number of times users clicked on any document for query Q. Component 403 may relate the relevance score for document D, as returned from ranking component 122, to the relevance score of each document E. For example, component 403 may store the differences between the relevance scores of document D and the relevance scores of the other documents.

Component 404 may store determinations of whether the document D is a pornographic document. This determination can be made based on, for example, key word comparison, domain name matching, manually entered information, etc.

Based on one or more of the parameters stored by components 401-404, decision component 410 determines whether to classify the document D as very relevant. This classification may be based on a number of functions that use the parameters stored by components 401-404. In one implementation, decision component 410 determines document D is very relevant when: (1) document D's position is first in the ranked list of results (determined based on component 401), (2) document D has a high click through rate, as may be determined by a pre-selected click through threshold (determined based on component 402), and (3) the relevance score for document D is significantly greater than the next highest relevance score in the returned set of documents (determined based on component 403). In some implementations, decision component 410 may additionally require that (4) document D is not classified as a pornographic document (determined based on component 404). The specific threshold values for the high click through rate (2) and the differences between relevance scores (3) may be determined by one of ordinary skill in the art via trial and error techniques.

Other functions, based on one or more of components 401-404, may be used by decision component 410 to determine whether a document is very relevant. For example, there may be a tradeoff between how high the click through rate for document D should be and how high the relevance score for document D should be. A high relevance score for document D is generally a good indication that document D is a good result. Accordingly, when document D has a high relevance score and is in the first position in the ranked list, decision component 410 may accept a moderate click through rate for document D and still classify the document as very relevant. On the other hand, if the relevance score for document D is low, decision component 410 may require a much higher click through rate and that the document is in the first position before classifying the document as very relevant. A similar tradeoff can be made with the click through rate and the difference in relevance scores between document D and the second place document in the ranked list. In general, one of ordinary skill in the art will recognize that other functions based on the parameters associated with components 401-404, or based on other parameters, can be used to determine whether a document is highly relevant, or more generally, to generate a value that measures the confidence level that the document is highly relevant. The observed historical click through rate, in particular, may be more generally defined as any parameter relating to logs that record user selections ("clicks") in response to being presented with search results or other lists of documents.

Further, one of ordinary skill in the art will recognize that a number of modifications are possible to the above-discussed techniques for displaying visual cues for select documents. For example, instead of rendering the thumbnails in real-time, the thumbnails may be pre-rendered for documents that have a high click through rate. Thus, documents that are likely to be displayed with a visual cue can be quickly returned to the user without having to first generate the thumbnail. Further, visual cues other than thumbnails may be presented to the users. For example, other forms of highlighting, such as a logo, contrasting textual fonts (e.g., text contrasted by size, color, or weight) that are designed to stand out, contrasting backgrounds, or textual labels may be used in place of thumbnails.

Additionally, parameters other than the above-described parameters may be used by decision component 410. For example, a parameter related to the click through rate may be defined as the historical ratio of the number of times that users have selected document D after submitting a query to the number of times that the query was submitted. Yet another parameter that could be used by decision component 410 is based on the text of the hyperlinks that connect web documents. In particular, this parameter may be based on the number of links pointing to document D in which the text that describes the link matches the search query. This number may be compared to the number of links pointing to the other documents in the returned set of documents in which the text of the link matches the search query.

Browse by Name

An additional embodiment of the techniques described above may be directed to allowing users to "browse by name." In general, a document that is considered to be very relevant may be considered to be the true target document that the user would like to access. Accordingly, instead of returning a list of search results to the user, the browser may be directed to immediately access the document.

Figure 5:
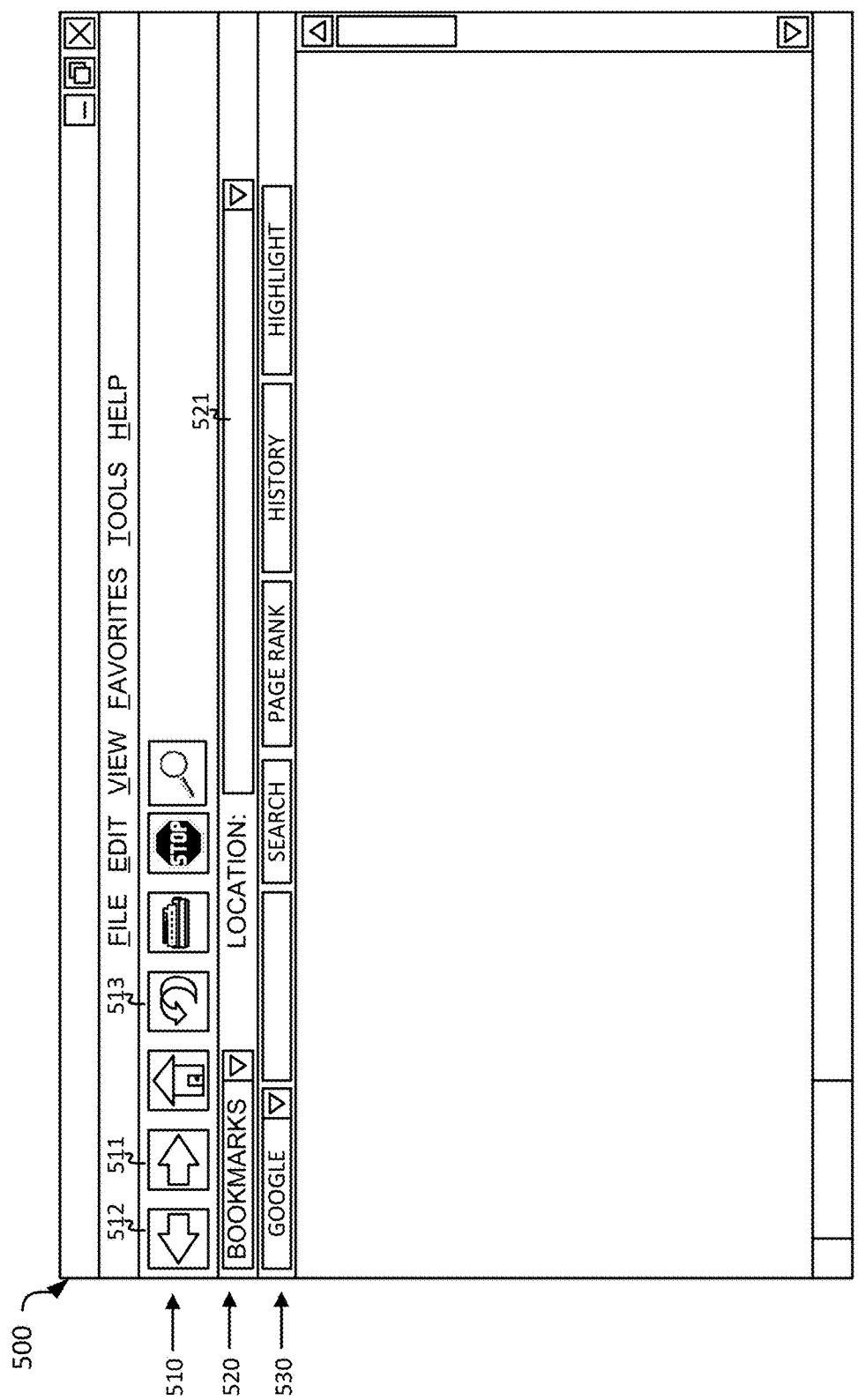
FIG. 5 is an exemplary diagram of a graphical user interface of a web browser.

FIG. 5 is a is an exemplary diagram of a graphical user interface of a web browser 500. Web browser 500 may be any of a number of known web browsers, such as the Internet Explorer browser from Microsoft Corporation. Web browser 500 may include a number of toolbars designed to assist the user in browsing the web. For example, a standard toolbar 510 may include a number of graphical buttons such as forward button 511, back button 512, and refresh button 513. The operation of the buttons on toolbar 510 are generally well known and will not be described in further detail. An address toolbar 520 may include an address field 521 through which a user may enter a location to which they would like to direct the browser. Additional toolbars, such as a third-party toolbar 530 may also be included. Toolbar 530 may be a toolbar designed to assist users in using a search engine.

Conventionally, when a user wishes to view a particular web site, the user will either enter the URL (uniform resource locator) of the site in address field 521 or choose from a list of sites that have been previously saved ("bookmarks"). The URL of a web document references the document using the general format: <protocol>:// <server>.<domain name>/<pathname>. For example, the URL "http://www.nps.gov/" specifies that the server (computing device) "www" at the domain "nps.gov" is to be accessed using the HTTP protocol. No pathname is specified, to which the server "www" may respond by returning a default web page, such as the home page for this web site. With some browsers, the user may not be required to enter the protocol field, as the browser may then assume that the user intended to use the HTTP protocol.

Entering complete URLs for a site that the user would like to visit can be inconvenient to the user. For example, the URL "http://www.nps.gov/grca," which refers to a web page hosted by the National Park Service about the grand canyon is not as easy or memorable for the user to type as the more natural language query "grand canyon." This inconvenience can be even more pronounced for speakers of languages that are not written using the English alphabet. The domain name system (DNS), which resolves the URLs, was only designed to operate with the English alphabet. Accordingly, if a user would like to access, for example, a Chinese site for content presented using Chinese characters, the user would still need to enter the URL using English characters.

Figure 6A:
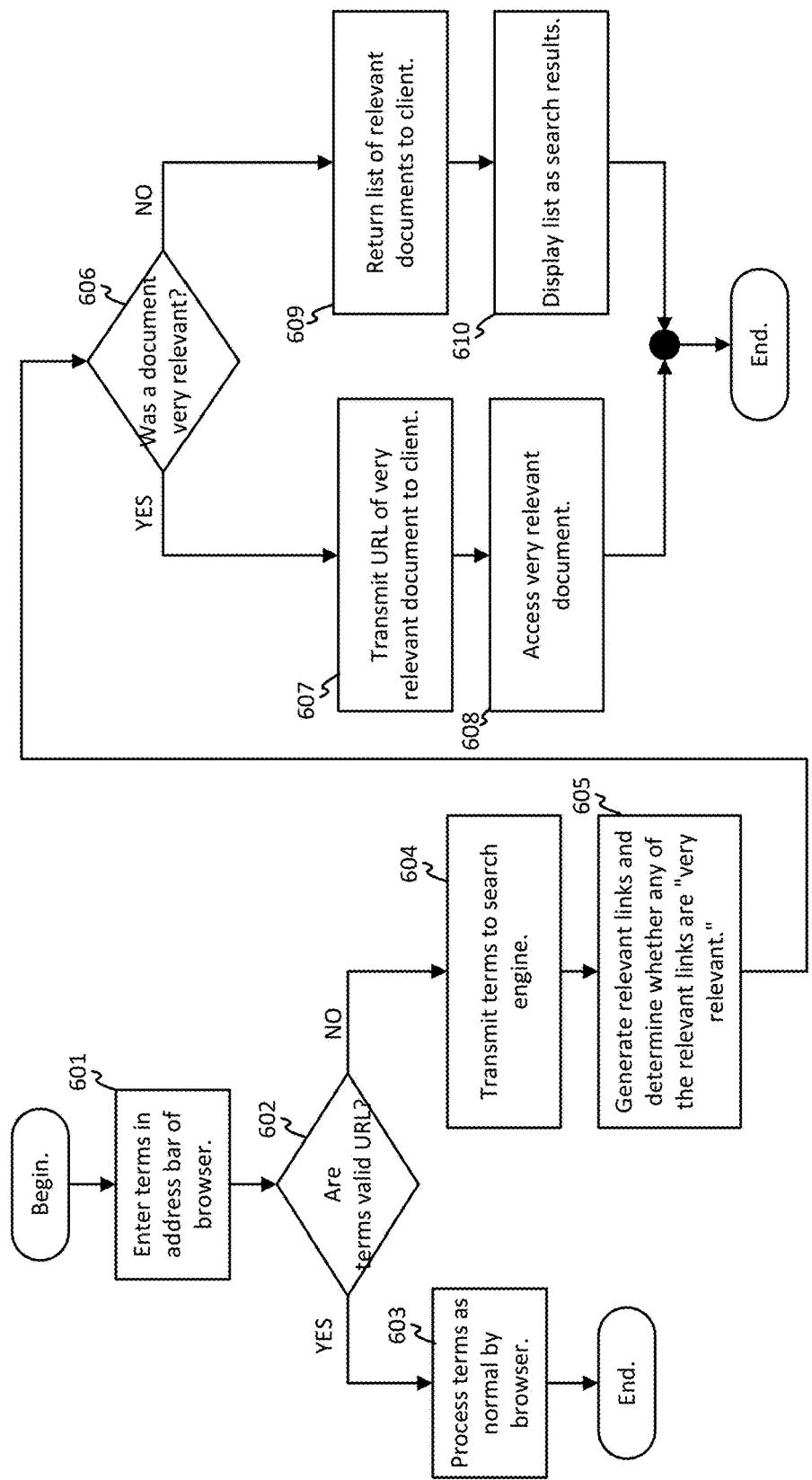
FIG. 6A is a flowchart illustrating operations of a search engine and client consistent with an aspect of the invention.

FIG. 6A is a flowchart illustrating operations of search engine 120 and client devices 102 consistent with an aspect of the invention. A user of browser 500 may enter terms in address field 521 of browser 500 (act 601). The terms may be natural language terms that the user believes describe a particular web site the user would like to access. The terms do not need to be in the format of a URL and can be entered in non-English characters (e.g., a Chinese or Japanese character set or other double byte characters). For example, if the user would like to access the National Park Service's web page about the grand canyon, the user can simply enter the terms "grand canyon." As additional examples, to visit the home pages of the companies IBM or Lands End, the user may simply enter "ibm" or "lands end," respectively, instead of "www.ibm.com" or "www.landsend.com," respectively.

The terms entered by the user may be examined to determine whether they constitute a valid URL or other locator (such as a reference to a local file) recognized by the browser (act 602). This examination may be performed by the browser, by a browser extension (e.g., toolbar 530), or by other processes executing at client device 102. A valid URL may be determined based on whether the terms are structured in the format of a URL, such as "www.ibm.com.". Additionally, in some implementations, the terms entered by the user may be given a chance to resolve using the normal DNS lookup system. If the terms are not resolved into an Internet address within a set time limit, or it is clear the browser 500 is not able to resolve the terms, the terms are determined to not constitute a valid URL.

Terms that define a valid URL are processed as normal to obtain the indicated web page (act 603). Terms that do not define a valid URL, however, may be treated as a search query and sent to search engine 120 (act 604). The search query may be processed by search engine 120 in a manner similar to the processing discussed with reference to FIG. 3. More specifically, the search engine may generate relevant links and determine whether any of the linked documents are "very relevant" (acts 605 and 606). In the context of this embodiment, "very relevant" can be defined as a document that the search engine determines, with reasonable certainty, is the document that the user is attempting to access. This determination can be made based on some or all of the factors previously discussed with respect to FIG. 4. Thus, for example, a ranking score of the document, click logs related to the document (e.g., historical click through rates), and the relevance score of the document may be examined. From one or more of these factors, whether one of the documents is very relevant can be determined.

Figure 7:
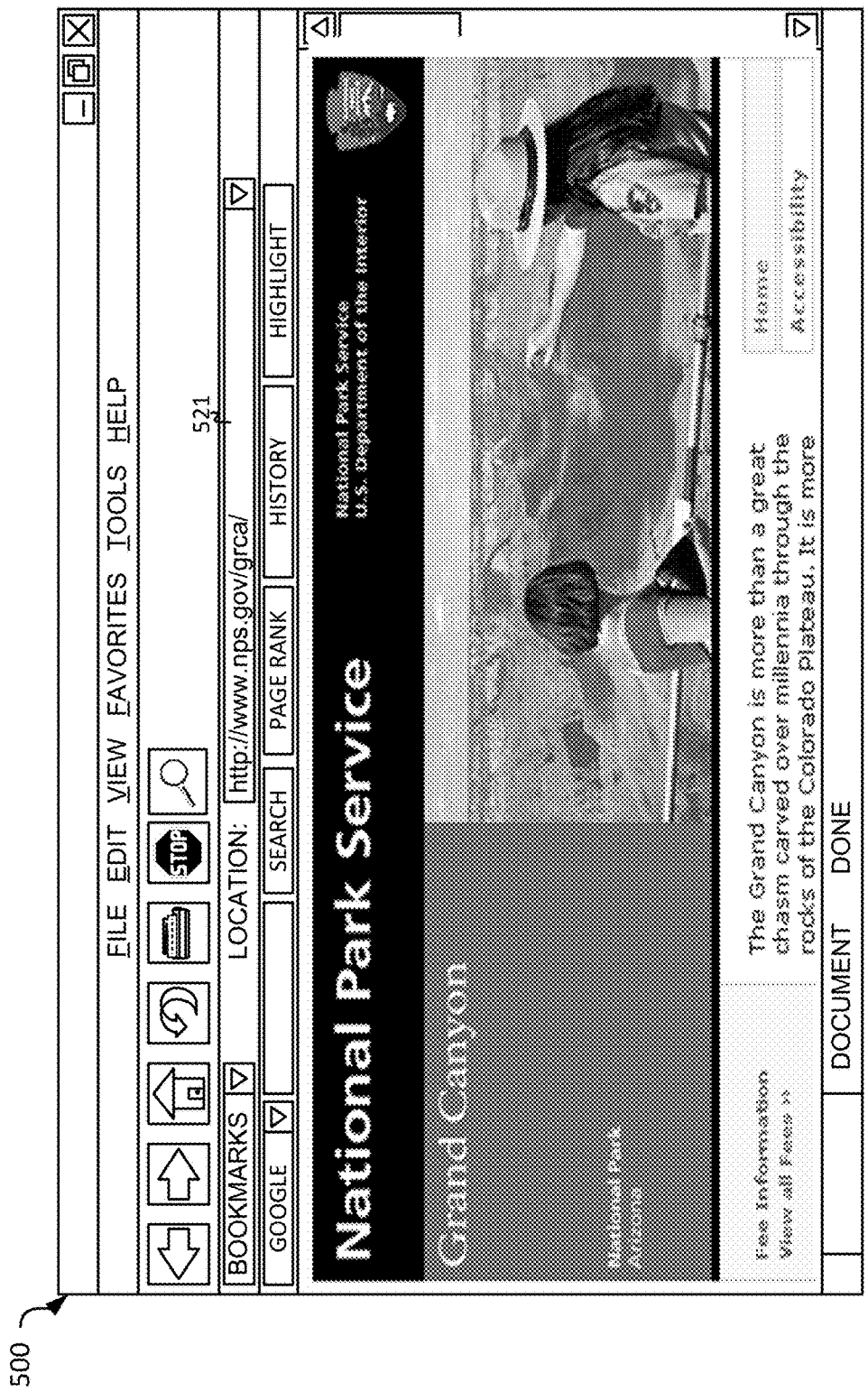
FIGS. 7 and 8 are exemplary diagrams of a graphical user interface associated with a web browser.

If one of the documents in the generated list of relevant links is determined to be very relevant, the URL of this document may be passed back to client device 102 (act 607). Browser 500 may then immediately display the document (act 608). FIG. 7 is an exemplary diagram of a graphical user interface of web browser 500 after the terms "grand canyon" were entered into address bar 521. As shown, server device 110 may have determined that the web page "http://www.nps.gov/grca/" was a very relevant document. The URL of this document may accordingly be placed into address bar 521 and the contents of the corresponding document accessed and displayed.

Figure 8:
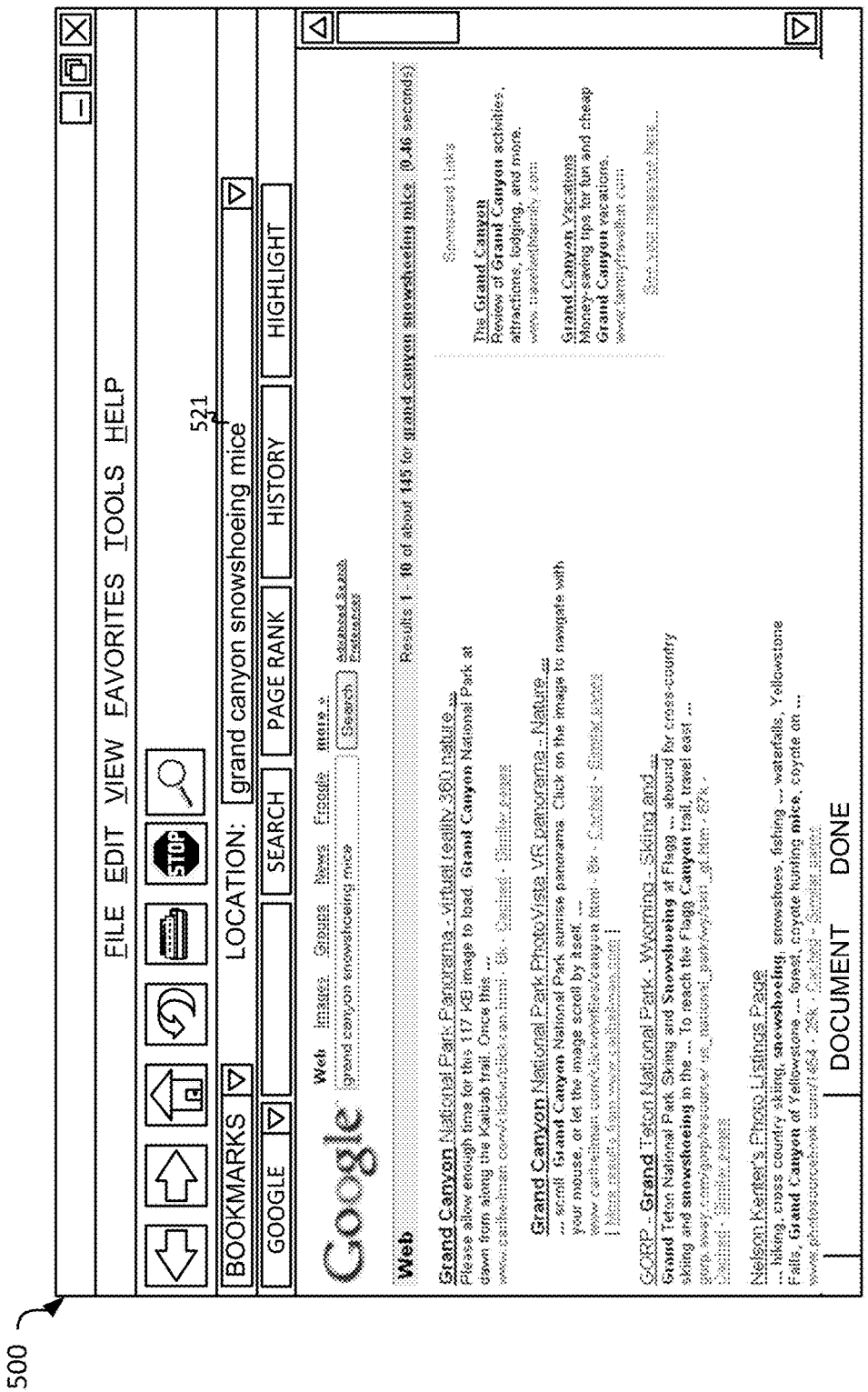

If no document is determined to be very relevant, server 110 may return the list of relevant documents to client device 102 (act 609). Client device 102 may then display the list to the user as a list of search results (act 610). FIG. 8 is an exemplary diagram of a graphical user interface of web browser 500 after the terms "grand canyon snowshoeing mice" were entered into address bar 521. For these terms, it may be determined that no web page is relevant enough to be determined to be the web page that the user is attempting to access. Instead, a standard search result page, including links and snippets describing the links, may be displayed to the user. If desired, the user may select one of the result links to access that particular web page.

Figure 6B:
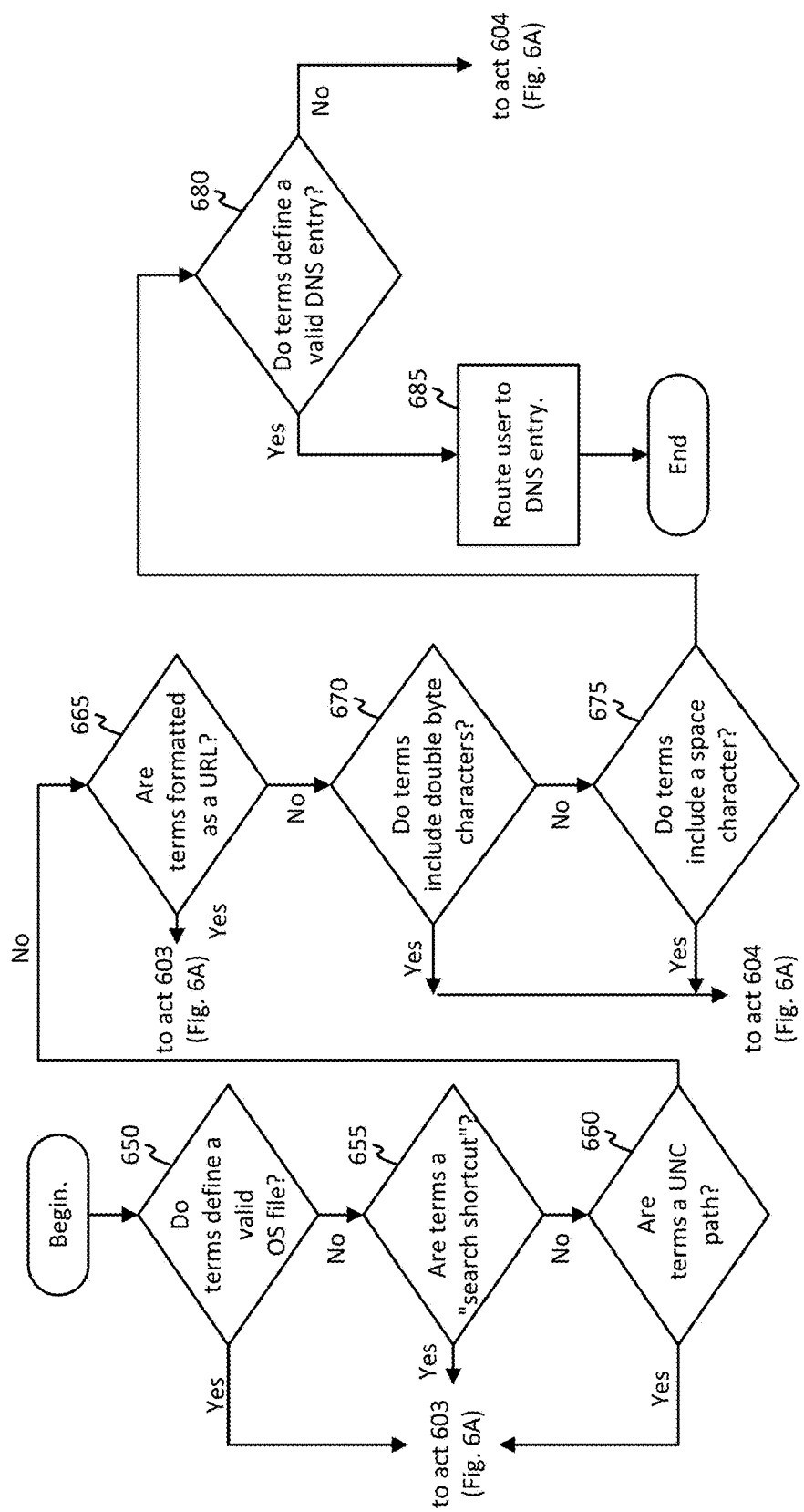
FIG. 6B is a flowchart illustrating exemplary operations for determining whether terms entered by the user are a valid URL.

FIG. 6B is a flowchart illustrating exemplary operations for determining whether terms entered by the user are a valid URL (act 602). Whether the terms are a "valid URL" can be more generally though of as whether the terms are a valid browser address bar entry. If so, the browser is allowed to proceed as normal. If not, acts 604-610 may be performed. The operations of FIG. 6B are based on an exemplary implementation using the Microsoft Internet Explorer web browser. Implementations in other browsers may differ.

The terms may first be examined to determine whether they define a valid operating system file that the browser would display (act 650). In some versions of Internet Explorer, users may type file names (e.g., local file names such as "C:\My Documents\myfile.txt") into the browser address bar. In response, the browser may display the file. If the terms define a valid file, the document may be accessed as normal by the browser (act 603). Otherwise, it may next be determined whether the terms are a "search shortcut" defined for the browser. Some browsers, such as Internet Explorer, allow the user to define "search shortcut" terms that the browser should interpret as a command to execute a search at a particular search engine. The user may, for instance, define the letter "g" to mean perform a search at the Google search engine. By typing "g Labrador Retriever dog" into the address bar, the user is instructing the browser to return results from the Google search engine for the search query "Labrador Retriever dog." It may next be determined if the terms entered by the user are a search shortcut (act 655). If so, the document may be accessed as normal by the browser (act 603).

It may next be determined whether the terms entered by the user define a universal naming convention (UNC) path (act 660). UNC paths are a standard way to access network shares in some Microsoft operating systems. Users sometimes enter such paths in the Internet Explorer address bar. If the terms are a valid UNC path, the terms may be processed as normal by the browser (act 603). It may next be determined whether the terms are formatted as a URL (act 665). If so, the document may be accessed as normal by the browser (act 603).

Next, it may be determined whether the terms are double-byte characters (act 670). If so, the terms are considered to not be a valid URL and processing proceeds to act 604. Next, it may be determined whether the terms include a space character (act 675). If so, the terms are considered to not be a valid URL and processing proceeds to act 604. Next, the local DNS system may be consulted to determine whether the terms define a valid DNS entry (act 680). Determining whether the terms are a valid DNS entry may be based on timeout period in which the DNS system responds. If a valid response is received from the DNS system within the timeout period, the user is routed to the DNS entry (act 685). Otherwise, processing proceeds to act 604.

The concepts described above allow users to enter natural language terms that describe a particular web site into a browser address field instead of a formal URL. The terms are evaluated to determine whether they correspond, with a high likelihood, to a particular web site. If so, this web site may be immediately accessed. If not, a list of search results based on the terms may be displayed by the browser. These concepts are particularly useful for non-English language users. These users can enter terms using their native written character set. The terms may be evaluated by a search engine as written and, if appropriate, the English character version of the URL corresponding to the non-English character terms may be returned and automatically accessed.

CONCLUSION

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

No element, act, or instruction used in the description of the application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   determining that, among a set of search results that include multiple search results and are each identified as at least potentially relevant by a search engine in response to a search query submitted to the search engine and based on content of a document associated with each search result, one single search result is classified by the search engine as very relevant to the search query based on at least one parameter, calculated by the search engine, that determines relevancy; and
   in response to determining that, among the set of search results that include multiple search results and that are each identified as at least potentially relevant by the search engine, based on the content of the document associated with each search result and in response to the search query submitted to the search engine, one single search result is classified by the search engine as very relevant to the search query, automatically outputting a web page that is referenced by the one single, search result that is classified by the search engine as very relevant to the search query, rather than providing a search results page that references a subset of the set of search results that are each identified as at least potentially relevant based on the content of the document associated with each search result and in response to the search query, the one single search result is classified as very relevant based on a relevance score for the result relative to relevance scores for other search results in a ranked list of search results; wherein
   automatically outputting the web page that is references by the one single, search result includes providing instructions that cause a client device to provide the web page to the user for display directly after the client device displays a page for the user to submit a search query to the search engine.

2. The method of claim 1, comprising classifying the one single search result as very relevant to the search query based on a parameter that is an observed historical click through rate associated with the one single search result, the one single search result being one of the one or more search results that are each classified as at least potentially relevant to the search query.

3. The method of claim 2, comprising calculating the observed historical click through rate as a ratio representing a total number of times users have selected the one single search result to a total number of times users have selected a second search result different from the one single search result.

4. The method of claim 2, comprising calculating the observed historical click through rate as a ratio representing a total number of times users have selected the one single search result in response to a search query to a total number of times users have selected other search results in response to the search query, the other search results being different from the one single search result.

5. The method of claim 1, wherein providing instructions that cause a client device to provide the web page to the user for display directly after the client device displays a page for the user to submit a search query to the search engine comprises:
providing instructions that cause a web browser on the client device to display the web page.

6. A system comprising:
one or more computers and one or more storage devices storing instructions that are configured to, when executed by the one or more computers, to cause the one or more computers to perform operations comprising:
determining that, among a set of search results that include multiple search results and are each identified as at least potentially relevant by a search engine in response to a search query submitted to the search engine and based on content of a document associated with each search result, one single search result is classified by the search engine as very relevant to the search query based on at least one parameter, calculated by the search engine, that determines relevancy; and
in response to determining that, among the set of search results that include multiple search results and are each identified as at least potentially relevant by the search engine, based on the content of the document associated with each search result and in response to the search query submitted to the search engine, one single search result is classified by the search engine as very relevant to the search query, automatically outputting a web page that is referenced by the one single, search result that is classified by the search engine as very relevant to the search query, rather than providing a search results page that references a subset of the set of search results that are each identified as at least potentially relevant based on the content of the document associated with each search result and in response to the search query, the one single search result is classified as very relevant based on a relevance score for the result relative to relevance scores for other search results in a ranked list of search results; wherein automatically outputting the web page that is referenced by the one single, search result includes providing instructions that cause a client device to provide the web page to the user for display directly after the client device displays a page for the user to submit a search query to the search engine.

7. The system of claim 6, the operations comprising classifying the one single search result as very relevant to the search query based on a parameter that is an observed historical click through rate associated with the one single search result, the one single search result being one of the one or more search results that are each classified as at least potentially relevant to the search query.

8. The system of claim 7, the operations comprising calculating the observed historical click through rate as a ratio representing a total number of times users have selected the one single search result to a total number of times users have selected a second search result different from the one single search result.

9. The system of claim 8, the operations comprising calculating the observed historical click through rate as a ratio representing a total number of times users have selected the one single search result in response to a search query to a total number of times users have selected other search results in response to the search query, the other search results being different from the one single search result.

10. The system of claim 6, wherein providing instructions that cause a client device to provide the web page to the user for display directly after the client device displays a page for the user to submit a search query is submitted to the search engine comprises:
providing instructions that cause a web browser on the client device to display the web page without additional input from the user after the search query is submitted to the search engine.

11. A non-transitory computer-readable medium storing software comprising instructions executable by one or more computers which, upon such execution, cause the one or more computers to perform operations comprising:
determining that, among a set of search results that include multiple search results and that are each identified as at least potentially relevant by a search engine in response to a search query submitted to the search engine and based on content of a document associated with each search result, one single search result is classified by the search engine as very relevant to the search query based on at least one parameter, calculated by the search engine, that determines relevancy; and
in response to determining that, among the set of search results that include multiple search results and are each identified as at least potentially relevant by the search engine, based on the content of the document associated with each search result and in response to the search query submitted to the search engine, one single search result is classified by the search engine as very relevant to the search query, automatically outputting a web page that is referenced by the one single search result that is classified by the search engine as very relevant to the search query, rather than providing a search results page that references a subset of the set of search results that are each identified as at least potentially relevant based on the content of the document associated with each search result and in response to the search query, the one single search result is classified as very relevant based on a relevance score for the result relative to relevance scores for other search results in a ranked list of search results; wherein automatically outputting the web page that is referenced by the one single search result includes providing instructions that cause a client device to provide the web page to the user for display directly after the client device displays a page for the user to submit a search query to the search engine.

12. The medium of claim 11, the operations comprising classifying the one single search result as very relevant to the search query based on a parameter that is an observed historical click through rate associated with the one single search result, the particular search result being one of the one or more search results that are each classified as at least potentially relevant to the search query.

13. The medium of claim 12, the operations comprising calculating the observed historical click through rate as a ratio representing a total number of times users have selected the one single search result to a total number of times users have selected a second search result different from the one single search result.

14. The medium of claim 12, the operations comprising calculating the observed historical click through rate as a ratio representing a total number of times users have selected the one single search result in response to a search query to a total number of times users have selected other search results in response to the search query, the other search results being different from the search result.

* * * * *